Feb. 18, 1930.                L. KIRLIN                1,747,515
                          LISTER CULTIVATOR
                         Filed Nov. 23, 1927
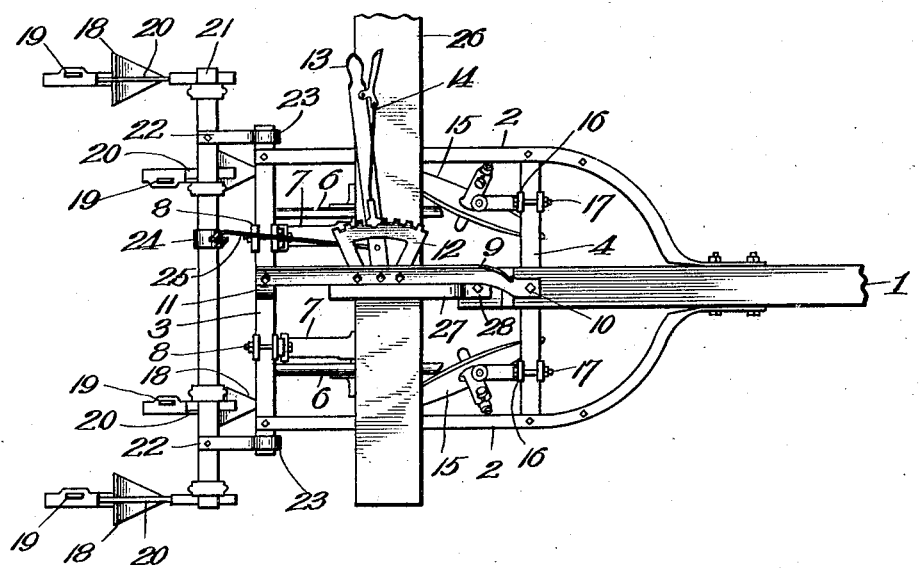
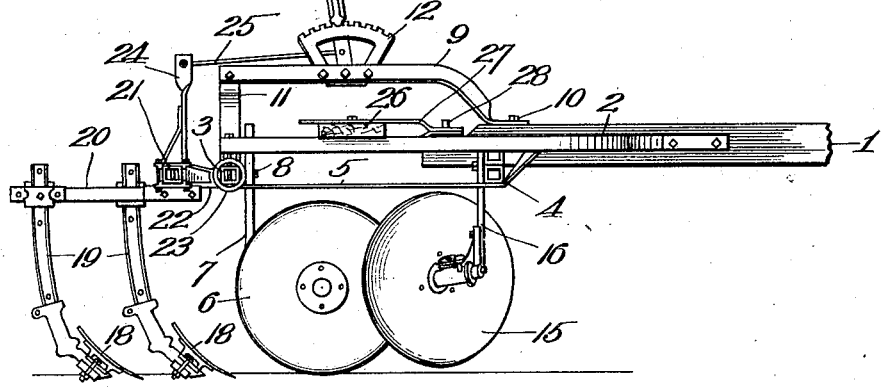
INVENTOR
Linden Kirlin
BY
Thorpe & Thorpe ATTORNEYS Patented Feb. 18, 1930

1,747,515

UNITED STATES PATENT OFFICE

LINDEN KIRLIN, OF BEATTIE, KANSAS

LISTER CULTIVATOR

Application filed November 28, 1927. Serial No. 236,182.

This invention relates to cultivators and more especially to cultivators of the type used in cultivating listed corn and adapted chiefly for cultivating two rows of corn at a time though adaptable for use in cultivating a single row at a time.

The improvement relates more particularly, to that class of cultivators in which two gangs of cultivating and supporting appliances are connected by a bridging bar or bars in such manner that the gangs will automatically adjust themselves to accommodate irregularities in the parallel relation of the furrows or in the pulling of the draft animals.

Heretofore all disk cultivators of the type referred to, have been mounted upon wheels or runners and have been provided behind the wheels or runners with soil-turning disks followed ordinarily by cultivating shovels, knives or the like. Cultivators of the type outlined have been used for many years and have always been open to the following objections, to wit: Lack of proper balance on the carrying wheels or runners; the necessity for raising the disks when turning at the ends of a field to avoid unnecessary work on the part of the draft animals; the imposition of undesirable tongue weight on the necks of the draft animals, especially when working in hard ground; and the necessity for driving very carefully in starting in at the end of a row to insure the entrance of the wheels or runners properly in the furrow and thus avoid injury to or destruction of plants by engagement therewith of the disks or shovels.

Accordingly it is my object to produce a cultivator in which the disks are located in front of instead of behind the wheels or runners. By so locating the disks it has been found in actual use in the field, that the weight of the machine is balanced more efficiently on the carrying wheels or runners, the hitch is shortened or brought closer to the draft of the machine and hence minimizes tongue weight on the horses and strain on the cultivator in crossing ditches in the field, and facilitates proper cultivation on side hills or in crooked listed furrows, and furthermore by having the shovels closer to the carrying wheels than was possible with the disks at the rear of the said wheels, the danger of the shovels coming in contact with the plants in the bottoms of the furrows is materially lessened. It has been found that, by this arrangement, the necessity for raising the disks in turning at the end of a field is avoided and it is only necessary to raise the shovels, which can be done by any boy large enough to drive the cultivator, which was not possible with cultivators having long shovel-carrying beams and hence considerably greater leverage against operation of the lever.

With the objects mentioned in view, the invention consists in certain novel and useful features of construction and combination of parts as hereinafter described and claimed; and in order that it may be fully understood, reference is to be had to the accompanying drawing, in which:

Figure 1 is a fragmentary plan view of a double row disk cultivator embodying the invention.

Figure 2 is a side view of the same.

Referring now to the drawing in detail, each single row cultivator or each gang or member of a double row cultivator, comprises a rigid skeleton frame composed of a tongue 1, and a rectangular frame consisting of a pair of side bars 2 spaced at opposite sides of and extending rearwardly beyond the tongue and having their front ends converging inwardly and fastened to the tongue, and of a rear cross bar 3 and front cross bar 4, said bars rigidly connecting the side bars. The frame also embodies longitudinal brace straps 5 rigid with the side bars 2 and underlying the same and forming a part of the rigid connection between the front and rear cross bars. Adjustably spaced apart are the carrying elements, shown in this instance as wheels 6, the same being disposed equal distances from the longitudinal axis of the tongue, and arms 7 on which the wheels are journaled, which arms are adjustably clamped as at 8 to the rear cross bar of the rectangular frame. As thus far described the construction is conventional and the same in both the single and double row type of cultivators. In the latter a longitudinal bar 9 is disposed in a plane above the frame and is rigidly secured at its front and rear ends to the tongue and the rear cross bar of the frame, the rear connection being preferably made through the intermediacy of an upright 11 secured in any suitable manner to the rear cross bar, and said bar 9 for the two row lister, is preferably laterally inclined to accommodate the inward and upward inclination of a toothed sector 12 rigidly secured to bar 9, and a lever 13 pivoted to said bar 9 and provided with the customary latch mechanism 14 for engagement with the sector. The inclination mentioned is necessary in the two row type of cultivator because the seat (not shown) for the driver, is located between the two gangs, and the driver with one hand or the other, must operate the levers respectively, in the construction shown, for raising the cultivating shovels hereinafter identified, of the respective gangs when turning at the end of a row.

For properly opening up the furrow at opposite sides of a row of plants being cultivated, disks 15 of conventional type are arranged directly forward of the wheels and are arranged in forwardly-converging relation for the purpose of turning the soil outwardly to a prescribed depth and making it easier for the wheels to maintain their proper position in the furrow with relation to the row of plants between them. The entire construction as thus far described with the fundamental exception of locating the disks in front of the wheels, is conventional and the disk supports are also of the usual or any preferred type, being shown in this instance as arms 16 adjustably clamped as at 17 on the front cross bar 4.

For cultivating the ground behind the wheels and outward thereof, shovels 18 or the like are employed, and it is preferred to use two sets of shovels, one set being very close to the carrying wheels and the other set a few inches to the rear and outward of the forward set. The shovels are provided with shanks 19 vertically adjustable on beams 20 secured as shown or in any other suitable manner at their front ends to a transverse bar 21 rearward of but adjacent to the rear bar 3 of the framework, and said transverse bar is provided with forwardly-projecting arms 22 terminating in bearing eyes or rings 23 hingedly engaging cross bar 3. To swing the bar 21, it is provided with an upwardly-projecting arm 24 pivotally connected at its upper end by a link 25 with the lever 13, so that when said lever is pushed forwardly, it will rock bar 21 and thus raise the cultivating shovels out of the ground, reverse movement of the lever embedding the shovels more or less deeply into the ground, it being of course understood that the latch and sector mechanism make provision for securing the swing bar against movement when adjusted in one direction or the other to the desired point.

Where the appliance is employed as a single row cultivator, the lever and its connections will preferably stand in an approximately vertical position and the seat, not shown, will preferably be located above or near the center of the framework as distinguished from the location of the seat hereinbefore adverted to when the appliance is in the form of a two row cultivator, and in the latter case the two gangs (only one appearing) are slidably connected by the customary bridge bar 26, the same being shown herein as pivotally mounted in a fork frame 27 pivoted at its front end at 28 to the rear end of the tongue.

As the function of the various parts has been set forth in detail and as the operation is substantially the same generally as in the conventional two row disk cultivator, it is not deemed necessary to recapitulate the advantages and operations of the various parts, it being understood of course that the structural characteristics may be modified in various particulars without departing from the principle of construction and mode of operation involved or from the spirit and scope of the appended claim.

I claim:

In a lister cultivator, a substantially horizontal framework, spaced carrying wheels supported from and underlying the framework, a ground engaging disk disposed forward of and angularly with reference to each carrying wheel for turning the soil in the line of travel of the latter, a transverse bar hingedly supported from the rear end of said framework in a plane above that of said wheels and disks and extending parallel with the axes of the former, cultivating devices supported from said bar for operating upon the soil outward of the lines of travel of said ground wheels and disks, and means for raising and holding said bar with its cultivating appliances in inoperative position, said means including a lever and latch mechanism inclining upwardly and laterally with respect to the framework.

In testimony whereof I affix my signature.

LINDEN KIRLIN.